United States Patent [19]
Wallmeier

[11] Patent Number: 6,031,822
[45] Date of Patent: Feb. 29, 2000

[54] METHOD FOR OPTIMIZED TRANSMISSION OF ATM CELLS VIA CONNECTION HOPS

[75] Inventor: Eugen Wallmeier, Eichenau, Germany

[73] Assignee: Siemens Aktiengesellschaft, Munich, Germany

[21] Appl. No.: 08/918,438

[22] Filed: Aug. 26, 1997

[30] Foreign Application Priority Data

Aug. 26, 1996 [DE] Germany ............................ 196 34 492

[51] Int. Cl.$^7$ ............................ H04Q 11/04; H04L 12/56
[52] U.S. Cl. ............................ 370/235; 370/395; 370/412
[58] Field of Search .................................... 370/230, 231, 370/332, 233, 235, 252, 253, 395, 412, 413, 414, 433, 535

[56] References Cited

U.S. PATENT DOCUMENTS 5,455,825  10/1995  Lauer et al. ............................ 370/413
5,533,020   7/1996  Byrn et al. ............................. 370/412
5,748,614   5/1998  Wallmeier .............................. 370/235
5,862,127   1/1999  Kwak et al. ............................ 370/233

OTHER PUBLICATIONS

International Journal of Communication Systems, vol. 7, pp. 307–318 (1994) entitled: Virtual Spacing for Flexible Traffic Control, by J.W. Roberts et al.

Primary Examiner—Ricky Ngo
Attorney, Agent, or Firm—Hill & Simpson

[57] ABSTRACT

A method for alleviating the loss of ATM cells when employing the weighted fair queuing scheduling method wherein the ATM cells are subjected to a peek bit rate limitation in a further stage of the method, and wherein such limitation is of the time interval of two read counters that sample the memory elements of a calendar in a cyclical time grid.

9 Claims, 4 Drawing Sheets

METHOD FOR OPTIMIZED TRANSMISSION OF ATM CELLS VIA CONNECTION HOPS

BACKGROUND OF THE INVENTION

1. Field of Invention

The present invention is directed to a method for optimizing the transmission of ATM calls via connection hops in order to avoid the loss of ATM cells when employing the weighted fair queuing scheduling method of transmitting cells according to particular requirements. ATM cells are subjected to a peak bit rate limitation wherein a limitation occurs of the time interval of two read counters which sample the memory elements of a calendar in a cyclical time grid.

2. Description of Prior Art

Information is transmitted in cells in contemporary ATM systems. These cells include a header part as well as an information part wherein connection information is stored in the header part and the useful data to be transmitted is stored in the information part. Actual data transmission occurs in the form of cell streams, which include a plurality of cells being transmitted via connection hops between transmitter and receiver. The requirement may potentially exist to utilize these connection hops in a way such that a number of transmitters would transmit their respective cell streams via the same connection hop.

In order to be able to implement the transmission of these cell streams according to their respective requirements, what are referred to as "scheduling methods" have prevailed in the prior art. Pursuant to such methods, the ATM cells are read out of buffer memories of a scheduler means in a specific sequence. The WEIGHTED FAIR QUEUEING SCHEDULING method may be used as an example of such a scheduling method. This known method is disclosed, for example, in the publication "Virtual Spacing For Flexible Traffic Control", J. W. Roberts, International Journal of Communication Systems, Vol. 7, 307–318 (1994). The individual cell streams have different weighting factors allocated to them according to which an actual transmission event is controlled on an individual connection hop.

What is problematical about this procedure is that many of the scheduling methods, including the weighted fair queueing scheduling method herein described, cannot assure a peak bit rate limitation on the following connection hops. This is required, however, everywhere that cell streams are conducted to nodes with small memories.

German Patent Application Serial No. 37 108 07 proposes a scheduling method by which the cell rates are matched to the transmission capacity of the connection hops. The method disclosed comprises two stages that are implemented in chronological succession. How these stages are fashioned, however, is not disclosed in detail.

Further, European Letters Patent 0 498 092 discloses a method wherein the individual connection transmission bit rate is strictly limited. This means, however, that a further connection setup is rejected. For example, as in the case of overload, a flexible manipulation is thus not possible.

SUMMARY OF THE INVENTION

The present invention is based on the object of optimally matching cell rates to the transmission capacity of connection hops. The present invention is also based on the object of flexibly controlling a potential overload case.

In an embodiment of the present invention, a method for the optimized transmission of ATM cells via connecting hops is provided which comprises the steps of: sorting a first variable from a second variable wherein the first variable contains system time and the second variable contains a desired handling time of a most recently handled stream of ATM cells; comparing the first variable to the second variable; allowing a further ATM cell to be transmitted when the first variable has reached or exceeded the desired handling time; forming a time interval between the first variable and the second variable; setting a predetermined threshold for the upward transgression of the time interval; and interrupting the incrementation when the predetermined threshold has been exceeded.

In an embodiment, first logical queues are defined in the means for scheduling, these being addressed according to the criterion of the entries actuated in a table as well as in a calendar. The first logical queues are respectively defined by both a buffer memory and memory cells of a cell memory whereby ATM cells are stored in the memory cells. Thereafter, the first logical queues are addressed according to this same entry criterion.

In an embodiment, the means for scheduling is addressed by a central scheduler block means according to the criterion of the entries actuated in the table as well as in the calendar.

In an embodiment, second logical queues are defined which represent a chained list of elements. The second logical queues are defined by entries in the calendar as well as an allocated memory. Such arrangement is advantageous in that the entries into this chained list can be handled in a more flexible manner.

In an embodiment, real-time ATM cells are also supplied to the scheduler block means with a higher priority than the ATM cells transmitted via the means for scheduling. These real-time ATM cells are supplied via a separate connection hop arranged parallel to the means for scheduling. These ATM cells are advantageously transmitted in the system with highest priority, as a result whereof echo suppression measures can be substantially omitted.

The advantage of the invention lies in prescribing a threshold by which a first variable is allowed to deviate from a second variable. When this threshold is upwardly transgressed, the incrementation of the first variable is interrupted until the prescribed threshold is again downwardly transgressed. A fair handling of all existing and, in case of overload, pre-existing connections is thereby achieved. In case of overload, this means that all connections send fewer ATM cells per second by the same factor.

Additional features and advantages of the present invention are described in, and will be apparent from, the detailed description of the presently preferred embodiments and from the drawings.

DETAILED DESCRIPTION OF THE PREFERRED EMBODIMENTS

Figure 1:
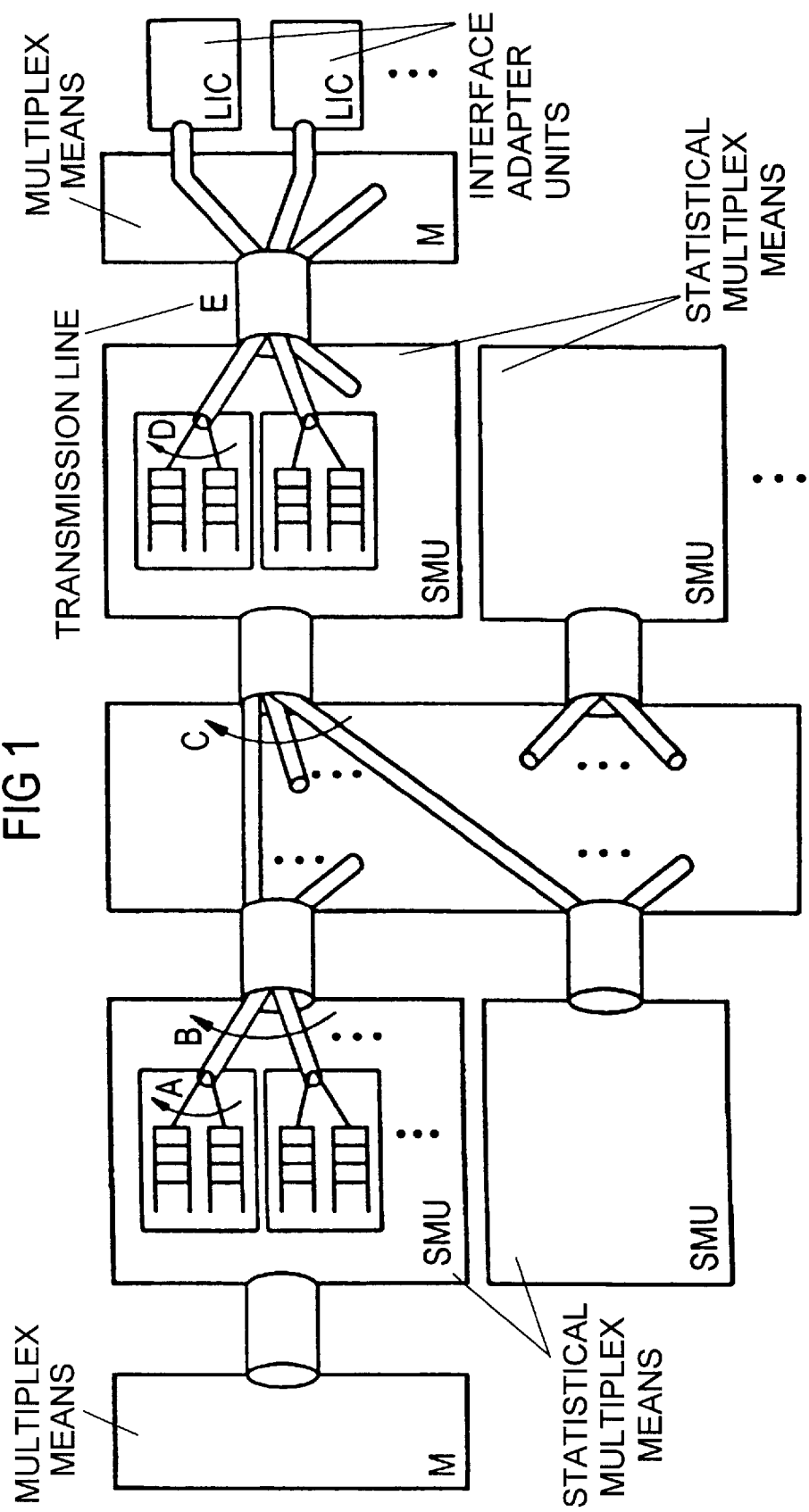
FIG. 1 shows a switching system in which the method of the present invention is to be implemented.

FIG. 1 shows a switching system in which a preferred method of the present invention is to be implemented.

Multiplexer means M are arranged at both the input side and output side of the switching system wherein the multiplex means M at the output side is connected to interface adapter units LIC. Statistical multiplex means SMU are also shown in which scheduling methods are implemented. Such scheduling methods are indicated in FIG. 1 by the letters A, B, C, D. Further, a transmission line E is shown having an input side connected to a plurality of schedule means via the statistical multiplex means SMU. At an output side, the transmission line E is connected to the multiplex means M at the output side of the system. The transmission line E, as well as the interface adaptor units LIC, are classified as critical elements within the switching system with regard to transmission capacity. Without special measures, ATM cells would have to be discarded in order to adhere to the maximum peak bit rate on the transmission line E.

Figure 2:
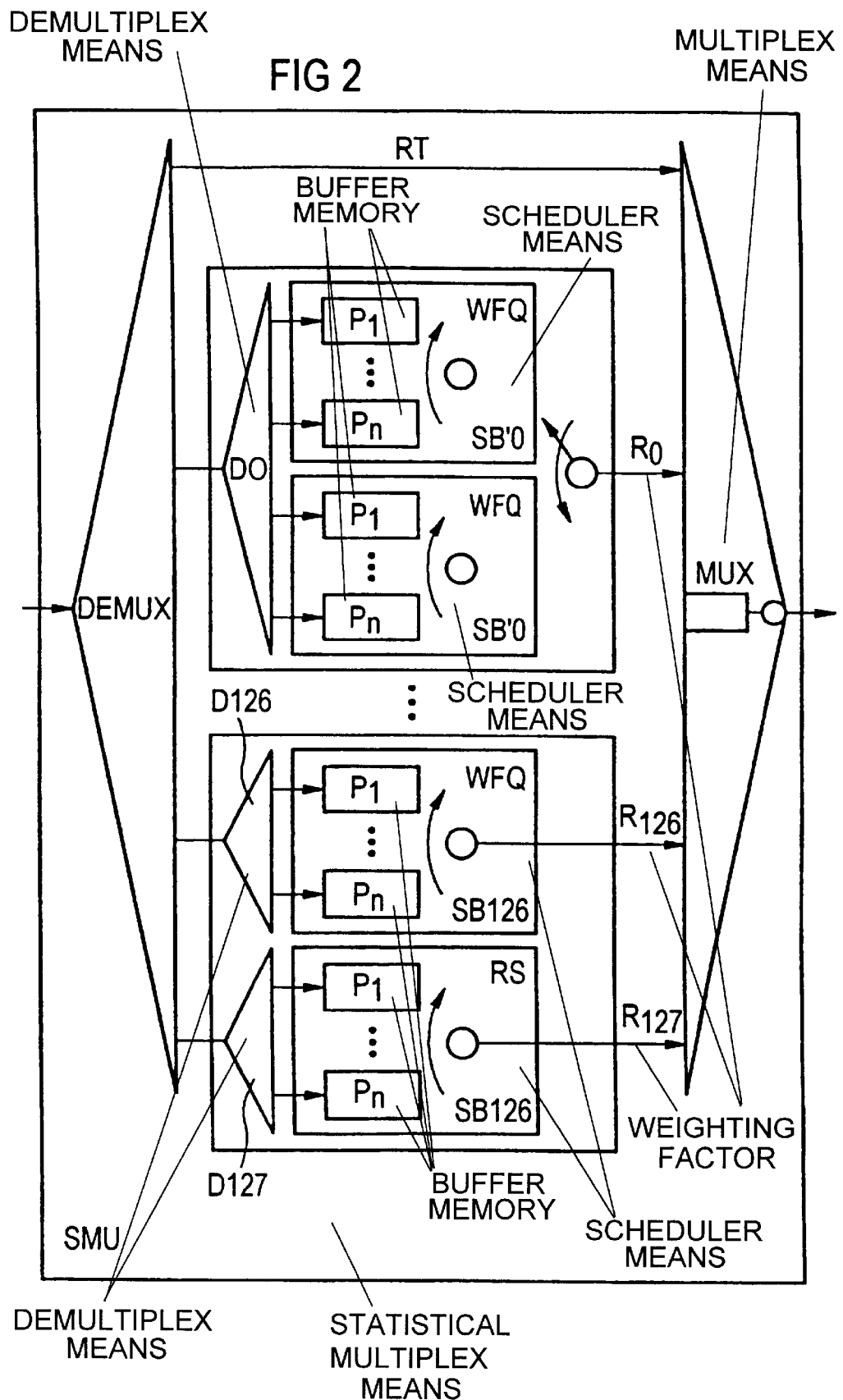
FIG. 2 shows an embodiment of a system incorporating the method of the present invention.

FIG. 2 shows the statistical multiplex means SMU in greater detail. ATM cells being inputted via a connection hop are supplied to the demultiplex means DEMUX. Thereafter, the ATM cells are processed by additional demultiplex means D0 ... D127 and forwarded to logical queues $W_1 ... W_n$ in the scheduler means SB0 ... SB127 in call-individual fashion. The scheduler means is formed of both a buffer memory $P_1 ... P_n$ as shown in FIG. 2 and a shared memory system Zsp as shown in FIG. 3.

Figure 3:
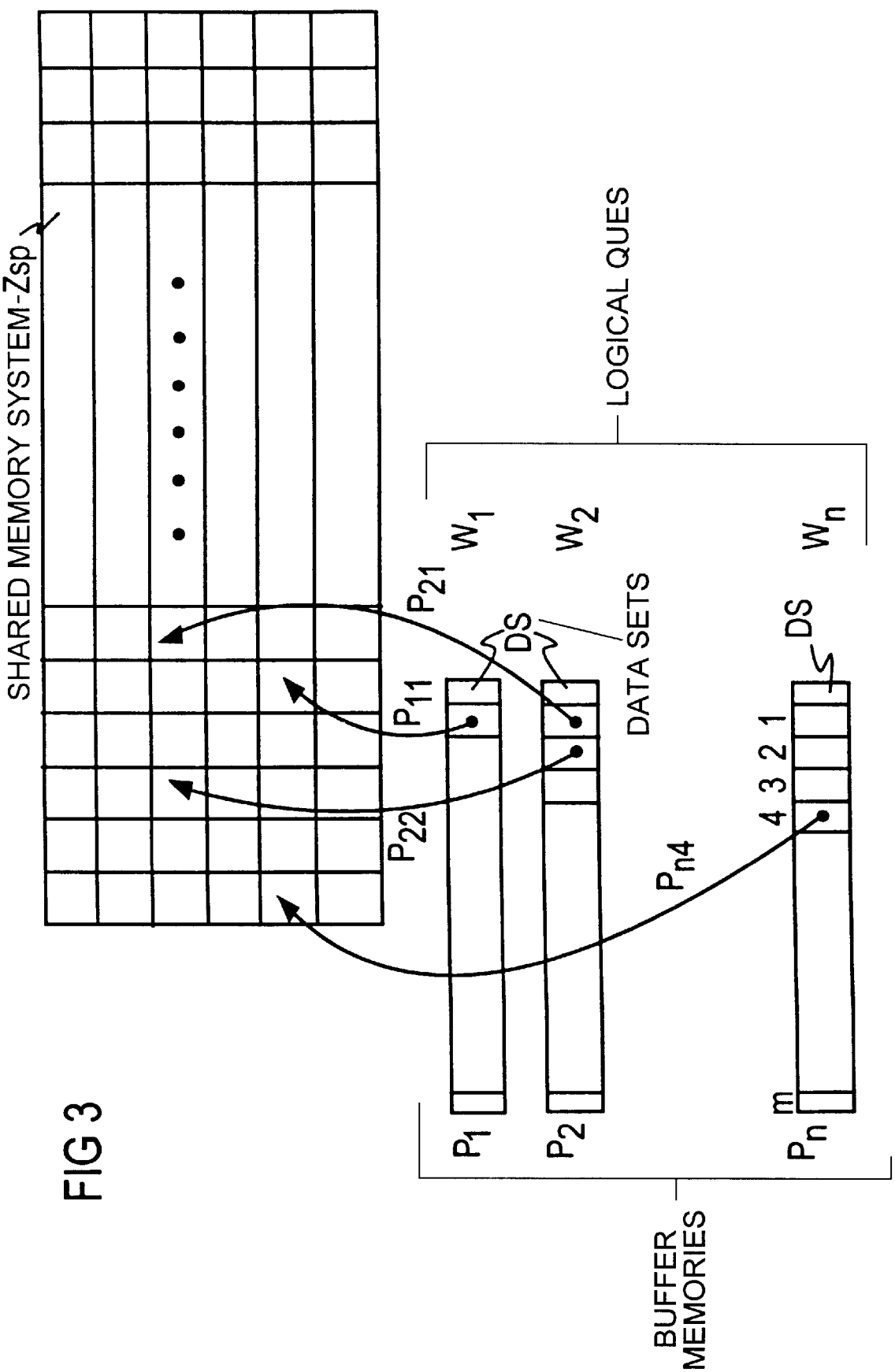
FIG. 3 shows the realization of logical queues in a shared memory system in accordance with the principles of the present invention.

The aforementioned scheduler means is shown in greater detail in FIG. 3. The shared memory system Zsp is formed of a plurality of memory cells which serve to accept ATM cells. Logical queue $W_1$ is correspondingly formed, for example, of a buffer memory $P_1$ and of the ATM cells which are stored in the cell memory Zsp and which belong to a specific connection. Logical queue $W_1$ is call-individually allocated to the connection having the number 1. The remaining logical queues $W_2 ... W_n$ are defined in the same way.

The buffer memories $P_1 ... P_n$, fashioned in a first in, first out method (FIFO), are also shown. The buffer memories comprise a plurality of memory elements $P_{n1} ... P_{nm}$ that have a pointer function. In addition, data sets DS are deposited in the buffer memories $P_1 ... P_n$ wherein individual data sets are respectively present one per buffer memory. Call-associated data, such as the peak cell rate PCR, for example, by which the ATM cells are to be transmitted, as well as the weighting factors $r_i$ critical for the weighted fair queuing scheduling method, are deposited in the buffer memories. These values are declared in the call setup and co-transmitted with the ATM cells.

An ATM cell being inputted into the system is not directly stored in one of the buffer memories $P_1 ... P_n$ but, rather, is written into the cell memory Zsp. Only the memory elements $P_{n1} ... P_{nm}$ are deposited in the buffer memories $P_1 ... P_n$; these indicating the corresponding memory cell in the cell memory Zsp in which the relevant ATM cell is deposited.

It is assumed in the present exemplary embodiment that the ATM cells are read out from the logical queues $W_1 ... W_n$ of the scheduling means SB0 ... SB127 according to a known scheduling method. Indeed, the known weighted fair queuing scheduling method WFQ is preferably employed in the scheduling means SB0 ... SB126. However, other scheduling methods are also possible. For example, a modified scheduling method, referred to as a rate shaping method RS, may also be employed.

According to the present exemplary embodiment, a two-stage scheduling method is implemented wherein the actual peak bit rate limitation is controlled in accordance with the rate shaping method RS. The known weighted fair queuing scheduling method WFQ forms the second stage of the two-stage method. Any desired scheduling method, however, may be implemented in the second stage since the second stage is independent of the method employed in the first stage.

In this respect, the employment of the Weighted Fair Queuing Scheduling method is not mandatory. Given employment of the Weighted Fair Queuing Scheduling method WFQ, different weighting factors are allocated to the various ATM cells, as initially described. With the assistance of these weighting factors, the ATM cells may be read out at a later time according to the criterion of a calendar mechanism.

The first stage of the two-stage method of the present invention is implemented on the statistical multiplex means SMU wherein the scheduler block means selects one of the scheduler means SB0 ... SB127 according to the criterion of a scheduling method. In the present embodiment, the aforementioned rate shaping method RS is employed.

In the statistical multiplex means SMU, additional weighting factors R0 ... R127 are allocated to the scheduler means SB0 ... SB127 to be selected. Such allocation is dependent on the bit rate of the path or the connecting line that is supplied by the corresponding scheduler means. The factor R, moreover, can be arbitrarily set. As a result, the peak bit rate can be limited to the following transmission hop. The selection of the pertinent scheduler means SB0 ... SB127 likewise occurs according to the criterion of the calendar mechanism that, as in the case of the rate shaping method RS sequencing the scheduler means SB127, experiences a slight modification.

In sum, one of the scheduler means SB0 ... SB127 is first selected according to the first stage of the two-stage method. In the present exemplary embodiment, this shall be the scheduler means SB0. Subsequently, one of the logical queues with the corresponding buffer memories $P_1 ... P_n$ is addressed by the executive sequence of the second stage of the two-stage method. For example, using buffer memory $P_1$ of the scheduler means SB0, the ATM cell stored first is transmitted to the scheduler block means SBS and supplied to the further devices. According to FIG. 1, further devices include the transmission line E, the multiplexer M at the output side of the system as well as the interface adapter units LIC.

The rate shaping method RS is always the only method implemented on the multiplex means SMU, thus assuring the limitation of the peak bit rate of a stream of ATM cells. As a rule, the stream of ATM cells represents a plurality of connections. This plurality takes into account the plurality of virtual channel numbers in a virtual path. In this respect, what is involved is the peak bit rate of the virtual paths.

The scheduler means are redundantly implemented in a further development of the invention. In the present exemplary embodiment, for example, this is indicated at the scheduler means SB0 by the scheduler means SB0 arranged parallel thereto.

In a further development of the present invention, real-time ATM cells RT are supplied to the scheduler block means SBS. These are ATM cells that are transmitted during the course of an on-line connection. It is generally true that these ATM cells must be handled with priority since the high demands, in terms of delay time, made of certain real-time connections otherwise cannot be met. As an example, we consider the echos which arise in voice connections as a consequence of mismatching and an excessively long delay time. In the method, a higher priority is allocated to these real-time ATM cells RT. This does not mean, however, that the ATM cells in the buffer memories $P_1 \ldots P_n$ cannot be transmitted to the scheduler block means SBS as long as real-time ATM cells RT are being transmitted. The real-time ATM cells RT are merely transmitted to the scheduler block means SBS without limitation of the peak bit rate. Therefore, the ATM cells RT can overtake the ATM cells to be handled in the scheduler means SB0 ... SB127 by the second stage of the two-stage scheduling method.

The calendar mechanism that is employed in the rate shaping RS method shall be herein explained in greater detail. It is important to note that the fundamental functioning of the rate shaping method RS is independent of whether it is implemented in the first or second stage. It is generally valid that the job of the calendar mechanism is to undertake pre-planning as to when and where and in what connection an ATM cell is to be read out and transmitted.

In accordance with this job description, two sequential scheduling methods sequencing successively are required. The first scheduling method (first stage) is implemented on the scheduler block means SBS. One of the scheduler means SB0 ... SB127 is selected at a specific, previously determined point in time $T_{now}$. The second scheduling method (second stage) is implemented in the scheduler means SB0 ... SB127. In contrast to the first stage, it is the buffer memories $P_1 \ldots P_n$ (queues) arranged in the scheduler means which are addressed in the second stage.

Figure 4:
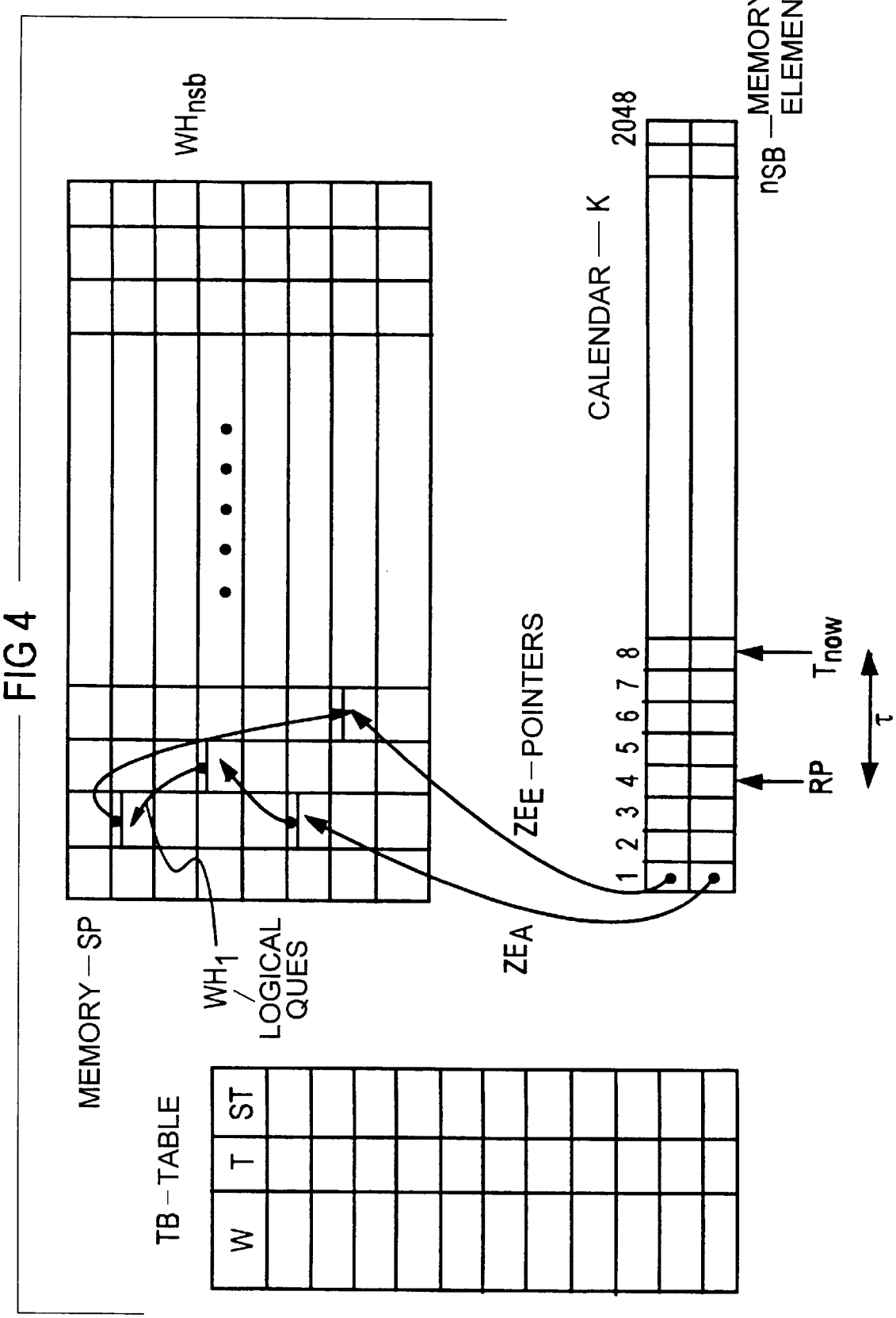
FIG. 4 shows a calendar mechanism portion of the method of the present invention.

A calendar K, as shown in FIG. 4, is constructed of memory elements $n_{SB}$ arranged in pairs. These memory elements are continuously and consecutively numbered and represent time intervals. A total of $n_{SB}=2048$ memory elements are provided in the present exemplary embodiment. Pointers $ZE_A$, $ZE_E$ are contained in such memory elements as entries. The pointer $ZE_A$ is intended to mark the beginning of a further logical queue while the pointer $ZE_E$ is intended to mark the end thereof in a further memory SP.

The memory SP, as well as further logical queues, are shown in FIG. 4. The individual memory cells of the memory SP are fashioned of two elements wherein one of the elements contains the address of a further memory cell of the memory SP. The remaining, larger element of the memory cell serves for the acceptance of an identification number. According to the present exemplary embodiment, this is the identification number of the logical queues $W_1 \ldots W_n$. The organization of the memory SP is in the form of a chained list, wherein the aforementioned further logical queues are defined. The further logical queues include a plurality of elements and are identified according to FIG. 4 by the reference characters $WH_1 \ldots WH_{nSB}$.

The building of the further logical queues $WH_1 \ldots WH_{nSB}$ occurs via the pointers $ZE_A$, $ZE_E$ defined in the calendar K. The pointer $ZE_A$ references the first element at the start of a logical queue. The remaining elements are defined by the remaining elements in the memory cells of the memory SP. The last element of this logical queue is that which contains the value 0 in the pertinent element of the memory cell. The end of this logical queue is therefore defined. The logical queues are allocated to every entry in the calendar K.

A table TB is also shown in FIG. 4. This table includes columns W, T and ST. The identification numbers of the logical queues $W_1 \ldots W_n$ are entered in column W. These are permanently stored in this column. Values $T_i$ are entered in column T and represent time units being inversely proportional to the respective value $R_i$ ($T_i=1/r_i$). The value $T_i$ represents a minimum interval between two successive ATM cells that must be adhered to, wherein the quantity $r_i$ is defined by the plurality of ATM cells/sec. The time at which the ATM cell should be read from the relevant logical queue, and transmitted, is entered in column ST. Since this time cannot always be exactly adhered to in practice (for example, given high load) it is more or less a desired time. According to the table TB, the peak bit rate (column T) and the desired time (column SP) to be read out is thus indicated for each of the logical queues $W_1 \ldots W_n$.

Read pointers $T_{now}$ and RP, arranged in pairs, run along the memory elements $n_{SB}$ of the calendar K within a cyclical time grid as shown in FIG. 4. The entries in these memory elements define the addresses of the memory cells in the memory SP which, in turn, include the identification numbers for the logical queues $W_1 \ldots W_n$. The read pointer $T_{now}$ represents the current system time and is incremented by a value $T_{step}$ which can be set by software. In order to obtain a reasonable order of magnitude of the calendar K ($n_{SB}=2048$), the read pointer $T_{now}$ is not incremented by 1 with every cell cycle, but only every four or eight cell cycles. The read pointer $T_{now}$ migrates along the entries at a constant speed. When the read pointer $T_{now}$ encounters an entry, the pointer $Z_A$ stored therein is identified and a branch is made to the address in the memory SP also stored therein. Since the first or, possibly, only element of a logical queue is deposited at this point, a branch is made thereto and the relevant ATM cell read out. When the read pointer $T_{now}$ encounters no entry, no action is undertaken.

However, the problem can potentially arise that the read pointer $T_{now}$ encounters a relatively extensive, logical queue $WH_1 \ldots WH_{nSB}$ in the memory SP. After the read-out of the ATM cell in the cell memory Zsp corresponding to the first element, further ATM cells must be read out. In such a case, the start address of the first element in the calendar K is updated, and the following element in the memory cell of the memory SP is addressed. Thereafter, the allocated ATM cell is read from the cell memory Zsp. These procedures are repeated until the value 0 is encountered in the one element of the memory cell of the memory SP and the end of the respective logical queue $WH_1 \ldots WH_{nSB}$ is signaled. This, however, also results in the read pointer $T_{now}$ being incremented by one even though it is still working on processing the logical queue $WH_1 \ldots WH_{nSB}$. A second read pointer RP is employed for this reason. This ensures that the read pointer RP implements the actual read events. In the processing of extremely long logical queues, the read pointer RP trails the read pointer $T_{now}$.

Given an extremely high load on the connections, the read pointer RP may trail the read pointer $T_{now}$ by so much that an unambiguous allocation of future and past is no longer established. This could occur, for example, when $T_{now}$ has already left the memory element $n_{SB}=2048$ and already points to the memory element 5; whereas the read pointer RP is still working on the processing of the memory element 10. In order to avoid such situations, the trailing of the read pointer RP behind the read pointer $T_{now}$ is deliberately limited. To this end, a value $T=T_{now}-RP$ is introduced, and defined as the difference between the two read pointers $T_{now}$ and RP. The maximum size of the value T can be prescribed by software.

When this maximum value is exceeded due to a high traffic load, the incrementation of the read pointer $T_{now}$ is interrupted. The read pointer RP thus comes closer and closer to the read pointer $T_{now}$. As a consequence, the ATM cells in the logical queues $W_1 \ldots W_n$ can be read out less often, corresponding to a lower transmission rate.

With regard to the time execution of the inventive method, an ATM cell first arrives in one of the logical queues $W_1 \ldots W_n$. The storing of the ATM cell occurs in the cell memory Zsp, whereas only the pointers $P_{n1} \ldots P_{nm}$ are deposited in the buffer memory. According to the present exemplary embodiment, the ATM cell is now written into a memory cell of the cell memory Zsp which is addressed by pointer $P_{11}$ defined in the buffer memory $P_1$. It is now important to note whether the logical queue $W_1$ is empty and, thus, whether it momentarily comprises no further ATM cells. Upon arrival of this ATM cell in the memory system Zsp, as well as a corresponding entry in the buffer memory $P_1$, a check is made in the field ST on the basis of the table TB to see the point in time at which the next ATM cell of this connection should be read out. When this point-in-time has passed, the identification number allocated to the logical queue $W_1$ is entered into the logical queue of the memory SP that is being addressed at the moment by the read pointer $T_{now}$. The entry always occurs at the end of the logical queue. This might also be the only entry.

When an ATM cell is read into one of the logical queues $W_1 \ldots W_n$ in which ATM cells are already deposited, then no immediate entry upon arrival occurs. Whether one of the logical queues contains ATM cells or not is determined by the buffer manager wherein, upon read out of an ATM cell from one of the logical queues $W_1 \ldots W_n$ it verifies whether this was the last ATM cell. When a determination is made that the logical queue is filled with further ATM cells, an immediate check is made in the table TB in column ST as to when the next ATM cell for this connection should be read out. For example, this should occur in 10 further cell cycles counting from the momentary status of the read pointer $T_{now}$. This time is thus entered in the column ST. Further, the logical queue $WH_1 \ldots WH_{nSB}$ in the memory SP is expanded by the allocated identification number, and the memory element $n_{SB}=T_{now}+10$ of the calendar K is updated with the pointers $Z_A$, ZE required therefor.

The calendar mechanism of the rate-shaping method is likewise executed in the scheduler block means SBS. Instead of the logical queues $W_1 \ldots W_n$, the scheduler block means SB0 ... SB127 are addressed and ATM cells are correspondingly read from the cell memories Zsp. Instead of the identification numbers W, those for the scheduler means SB0 ... SB127 are deposited in the table TB. Likewise, weighting factors $R_j$ are calculated instead of the weighting factors $r_i$, and are deposited in the column ST. Further, the value T is selected such that the interruption of the incrementation of $T_{now}$ occurs with only a very slight probability. The selected value T is dependent on the maximally possible load on the output line. In order to be able to assure a maximum load of 95%, the value $T=256*T_{step}$ should be selected. $T=128*T_{step}$ is adequate for a load of 90%.

A special characteristic is also established in the calendar mechanism which sequences the scheduler block means SBS. FIG. 2 shows ATM cells RT that are conducted past the scheduler SB0 ... SB127 and are directly supplied to the scheduler block means SBS. These are the aforementioned real-time ATM cells.

When a real-time ATM cell arrives in the cell memory ZSP, the allocated identification number RT-ID is entered in the logical queue of the memory SP that is just being addressed by the read pointer $T_{now}$. The entry always ensues at the end of the logical queue. This entry might also be the only entry. These high-priority ATM cells are thus read immediately.

Although the present invention has been described with reference to a specific embodiment, those of skill in the art will recognize that changes may be made thereto without departing from the spirit and scope of the invention as set forth in the hereafter appended claims.

I claim as my invention:

1. A method for optimized transmission of ATM cells via connecting hops, the method comprising the steps of:

sorting a first variable containing system time from a second variable containing a desired handling time of a most recently handled stream of ATM cells;

comparing the first variable to the second variable in a cyclical time grid;

allowing a further ATM cell to be transmitted when the first variable has reached or exceeded the desired handling time;

forming a time interval between the first variable and the second variable;

setting a predetermined threshold for the upward transgression of the time interval; and interrupting the incrementation of the first variable when the predetermined threshold has been exceeded until the predetermined threshold is downwardly transgressed.

2. A method as claimed in claim 1, further comprising the steps of:

providing means for scheduling;

defining first logical queues in the means for scheduling; and addressing the first logical queues according to entry criterion actuated in a table as well as in a calendar.

3. A method as claimed in claim 1, further comprising the steps of:

providing a central scheduler block means; and addressing the means for scheduling with the central scheduler block means according to the entry criterion actuated in the table as well as in the calendar.

4. A method as claimed in claim 1, further comprising the step of:

defining second logical queues which represent a chained list of elements relating to entries in the calendar and an allocated memory.

5. A method as claimed in claim 2, further comprising the step of:

defining second logical queues which represent a chained list of elements relating to entries in the calendar and an allocated memory.

6. A method as claimed in claim 3, further comprising the step of:

defining second logical queues which represent a chained list of elements relating to entries in the calendar and an allocated memory.

7. A method as claimed in claim 1, further comprising the steps of:

providing a separate connection hop arranged parallel to the means for scheduling; and supplying real-time ATM cells via the separate connection hop to the scheduler block means with a higher prioritization than the ATM cells transmitted via the means for scheduling.

8. A method as claimed in claim 2, further comprising the steps of:

providing a separate connection hop arranged parallel to the means for scheduling; and supplying real-time ATM cells via the separate connection hop to the scheduler block means with a higher prioritization than the ATM cells transmitted via the means for scheduling.

9. A method claimed in claim 3, further comprising the steps of:

providing a separate connection hop arranged parallel to the means for scheduling; a supplying real-time ATM cells via the separate connection hop to the scheduler block means with a higher prioritization than the ATM cells transmitted via the means for scheduling.

* * * * *